US010902535B2

(12) United States Patent
Shobayashi (10) Patent No.: US 10,902,535 B2
(45) Date of Patent: Jan. 26, 2021

(54) INFORMATION PROCESSING DEVICE, METHOD AND PROGRAM

(71) Applicant: Masayuki Shobayashi, Tokyo (JP)

(72) Inventor: Masayuki Shobayashi, Tokyo (JP)

( * ) Notice: Subject to any disclaimer, the term of this patent is extended or adjusted under 35 U.S.C. 154(b) by 171 days.

(21) Appl. No.: 15/563,859

(22) PCT Filed: Apr. 8, 2016

(86) PCT No.: PCT/JP2016/061586
§ 371 (c)(1),
(2) Date: Oct. 2, 2017

(87) PCT Pub. No.: WO2016/163529
PCT Pub. Date: Oct. 13, 2016

(65) Prior Publication Data
US 2018/0075556 A1    Mar. 15, 2018

(30) Foreign Application Priority Data
Apr. 9, 2015    (JP) .................................. 2015-080125

(51) Int. Cl.
*G06F 16/00*    (2019.01)
*G06Q 50/18*    (2012.01)
(Continued)

(52) U.S. Cl.
CPC ..... *G06Q 50/184* (2013.01); *G06F 16/24578* (2019.01); *G06F 16/353* (2019.01);
(Continued)

(58) Field of Classification Search
CPC ............. G06F 2216/11; G06F 17/2211; G06F 17/274; G06F 17/2765; G06F 17/278;
(Continued)

(56) References Cited

U.S. PATENT DOCUMENTS 9,910,899 B1 *    3/2018    Fields ................ G06F 16/3344
2005/0177378 A1    8/2005    Tazawa
(Continued)

FOREIGN PATENT DOCUMENTS

CN    102298583 A    12/2011
CN    103825951 A    5/2014
(Continued)

OTHER PUBLICATIONS

International Search Report for PCT/JP2016/061586, Engl. translation, search dated Jun. 7, 2016 (2 pages).
(Continued)

*Primary Examiner* — Shyue Jiunn Hwa
(74) *Attorney, Agent, or Firm* — Studebaker & Brackett PC (57) ABSTRACT

In this information processing device, a claim term frequency distribution generation unit separates the content of the claims in a publication into individual terms and generates a claim term frequency distribution indicating the frequency distribution of each separated term. A description term frequency distribution generation unit separates the content of the specification in the publication into individual terms and generates a description term frequency distribution indicating the frequency distribution of each separated term. A description synonym frequency distribution generation unit classifies each term extracted from the specification into a plurality of groups respectively corresponding to the plurality of terms in the claims, and generates a description synonym frequency distribution indicating a frequency distribution in which each of the classified plurality of groups serves as a unit. An evaluation information generation unit generates evaluation information on the basis of the claim term frequency distribution and the description term synonym frequency distribution.

5 Claims, 4 Drawing Sheets

(51) Int. Cl.
    *G06F 16/35* (2019.01)
    *G06F 16/2457* (2019.01)
    *G06F 40/216* (2020.01)
    *G06F 40/247* (2020.01)
    *G06K 9/00* (2006.01)

(52) U.S. Cl.
    CPC .......... *G06F 40/216* (2020.01); *G06F 40/247* (2020.01); *G06K 9/00442* (2013.01); *G06Q 50/18* (2013.01)

(58) Field of Classification Search
    CPC ............. G06F 11/0724; G06F 11/0793; G06F 13/1663; G06F 16/3344; G06F 16/40; G06F 16/93; G06F 17/30011; G06F 17/3053; G06F 17/30539; G06F 17/5022; G06F 17/505; G06F 21/10; G06F 3/0484; G06F 9/52; G06F 16/2379; G06F 16/27; G06F 9/466; G06F 1/163; G06F 9/543; G06F 3/00; G06F 19/325; G06F 19/3468; G06F 3/011; G06F 3/013; G06F 3/014; G06F 3/017; G06F 16/90335; G06F 16/904; G06F 2111/10; G06F 30/20; G06F 16/21; G06F 16/22; G06F 16/25; G06F 16/358; G06F 16/367; G06F 1/1694; G06F 2203/011; G06F 2203/0384; G06F 3/012; G06F 3/015; G06F 3/0304; G06F 40/247; G06F 11/2094; G06F 16/24578; G06F 16/28; G06F 16/353; G06F 16/90332; G06F 16/9536; G06F 16/9537; G06F 16/9554; G06F 19/00; G06F 40/117; G06F 40/205; G06F 40/216; G06F 9/06
    See application file for complete search history.

(56) References Cited

U.S. PATENT DOCUMENTS

| | | |
|---|---|---|
| 2006/0156268 A1 | 7/2006 | Wen et al. |
| 2008/0195678 A1 | 8/2008 | Chen et al. |
| 2008/0208700 A1 | 8/2008 | Davis |
| 2008/0281915 A1* | 11/2008 | Elad .................. G06Q 30/02 709/204 |
| 2009/0024486 A1 | 1/2009 | Sevrain |
| 2009/0054157 A1 | 2/2009 | Hamilton et al. |
| 2009/0228777 A1 | 9/2009 | Henry et al. |
| 2010/0114587 A1* | 5/2010 | Masuyama ............ G06Q 10/10 705/1.1 |
| 2011/0191310 A1* | 8/2011 | Liao ...................... G06F 16/313 707/706 |
| 2011/0302045 A1 | 12/2011 | Lee et al. |
| 2012/0076413 A1 | 3/2012 | Ferman |
| 2013/0046754 A1 | 2/2013 | Lee |
| 2013/0145283 A1 | 6/2013 | Lee |
| 2014/0075004 A1* | 3/2014 | Van Dusen ............ H04L 41/04 709/223 |
| 2014/0200880 A1 | 7/2014 | Neustel |

FOREIGN PATENT DOCUMENTS

| | | |
|---|---|---|
| JP | 2001-306852 A | 2/2001 |
| JP | 2001-306852 A | 11/2001 |
| JP | 2002-132790 A | 5/2002 |
| JP | 2002-245067 A | 8/2002 |
| JP | 2004-280756 A | 10/2004 |
| JP | 2004-361992 A | 12/2004 |
| JP | 2005-301856 A | 10/2005 |
| JP | 2007-011876 A | 1/2007 |
| JP | 2009-86944 A | 4/2009 |
| JP | 2010-049706 A | 3/2010 |
| JP | 2010-0497806 A | 3/2010 |
| JP | 2011-258198 A | 12/2011 |
| JP | 2013-080278 A | 5/2013 |
| JP | 2014-010728 A | 1/2014 |
| WO | 2009/150758 A1 | 12/2009 |

OTHER PUBLICATIONS

Written Opinion for PCT/JP2016/061586, dated Oct. 13, 2016 (4 pages).
Written Opinion and Int'l Search Report from related case PCTY/JP2016/061585, dated Jun. 28, 2016 (7 pages).
EP Office Action for EP application 16776694.8, from related case, dated Jan. 12, 2018 (6 pages).
Suppl. European Search Report for EP Application 16776694.8, from related case, dated Nov. 16, 2017 (4 pages).
EP Office Action for EP Application 16775694.8, from related case, dated Jan. 12, 2018 (6 pages).
IPRP for PCT Appl. PCT/JP2016/061586, mailed Oct. 10, 2017 (5 pages).
Office Action, related U.S. Appl. No. 15/563,805, dated May 13, 2019, 30 pages.
Manual of Patent Examining Procedure, Mar. 2014, United States Patent and Trademark Office, 9th Edition Revision date [R-11. 2013], (section 1502.01) (Year: 2014), and current version, R-07. 2015, 3 pages.
Manual of Patent Examining Procedure, Mar. 2014, United States Patent and Trademark Office, 9th Edition Revision date [R-11. 2013], (section 213.01) (Year: 2014), and current version, R-08. 2017, 8 pages.
Manual of Patent Examining Procedure, Mar. 2014, United States Patent and Trademark Office, 9th Edition Revision date [R-11. 2013], (section 901) (Year: 2014), and current version, R-08.2017, 4 pages.
Manual of Patent Examining Procedure, Mar. 2014, United States Patent and Trademark Office, 9th Edition Revision date [R-11. 2013], (section 601) (Year: 2014) and current version, R-07.2015, 6 pages.
A Final Office Action issued by the USPTO in the related U.S. Appl. No. 15/563,805, dated Dec. 12, 2019.
An Office Action mailed by the State Intellectual Property Office of the People's Republic of China dated Mar. 31, 2020, which corresponds to Chinese Patent Application No. 201680020534.8 and is related to U.S. Appl. No. 15/563,859.
Office Action issued by the China National Intellectual Property Administration dated Sep. 29, 2020, which corresponds to Chinese Patent Application No. 201680020618.1 and is related to U.S. Appl. No. 15/563,859 with English language translation.

* cited by examiner

| CLAIM TERM FREQUENCY | | |
|---|---|---|
| RANKING | TERM | FREQUENCY |
| 1 | ELASTIC BODY | 32 |
| 2 | STRESS | 24 |
| ... | ... | ... |
| 5 | THE | 18 |
| ... | ... | ... |
| N | | |

71

| SPECIFICATION TERM FREQUENCY | | |
|---|---|---|
| RANKING | TERM | FREQUENCY |
| 1 | STRESS | 32 |
| 2 | SPRING | 43 |
| 3 | RUBBER | 31 |
| ... | ... | ... |
| n | | |

72

| SPECIFICATION SYNONYM FREQUENCY | | |
|---|---|---|
| RANKING | TERM | FREQUENCY |
| 1 | SPRING, RUBBER | 74 |
| 2 | STRESS | 54 |
| ... | ... | ... |
| m | | |

73

NOISE

SCORE → EVALUATION INFORMATION 54

FIG. 4

INFORMATION PROCESSING DEVICE, METHOD AND PROGRAM

RELATED APPLICATIONS

This application claims priority, under the terms of 35 U.S.C. § 371(c), to PCT/JP2016/061586, filed Apr. 8, 2016, and which is incorporated by reference in its entirety; PCT/JP2016/061586 claims priority to Japanese national application 2015-080125, filed Apr. 9, 2015, which is also incorporated by reference in its entirety.

TECHNICAL FIELD

The present invention relates to an information processing device, method and program.

BACKGROUND ART

Heretofore, patent rights have been acquired by many companies with an aim such as to protect their businesses that are planned to be carried out or currently carried out. Further, patent rights are property rights, and can also be effectively utilized by transferring the rights, establishing an exclusive license, or granting a non-exclusive license to a third party.

In order to acquire patent rights, an application and documents attached to the application are required to be submitted. Claims, a specification, drawings and an abstract exist as documents attached to an application. A great deal of research and development have been conducted for technologies to assist the creation of documents attached to an application (e.g. refer to Patent Document 1), or technologies to analyze the sentence structures, etc. in documents attached to an application (e.g. refer to Patent Document 2).

Patent Document 1: Japanese Unexamined Patent Application, Publication No. 2013-080278;
Patent Document 2: Japanese Unexamined Patent Application, Publication No. JP 2014-010728.

DISCLOSURE OF THE INVENTION

Problems to be Solved by the Invention

However, although it has been required to achieve an appropriate method for evaluating the quality of a publication such as a specification, conventional technologies including Patent Documents 1 and 2 have been unable to sufficiently meet such a demand.

The present invention has been made in view of the situation as such, and aims to achieve an appropriate method for evaluating the quality of a publication such as a specification.

Means for Solving the Problems

An information processing device according to one aspect of the present invention includes: first information generation means that separates a content of a first document that may be included in a publication relating to an intellectual property right into predetermined unit information pieces including a character, diagram, symbol or combination thereof, and generates first information indicating a frequency distribution of the unit information pieces separated; second information generation means that separates a content of a second document that may be included in the publication into the unit information pieces, and generates second information indicating a frequency distribution of the unit information pieces separated; and evaluation information generation means that generates evaluation information for evaluating the content of the publication, based on the first information and the second information.

Here, the information processing device further includes a third information generation means that classifies each of the unit information pieces in the second information into a plurality of groups respectively corresponding to a plurality of unit information pieces in the first information, and generates third information indicating a frequency distribution, in which each of the plurality of groups classified serves as a unit, and the evaluation information generation means can generate the evaluation information, based on the first information and the third information.

The evaluation information generation means can calculate scores based on a ranking difference from a corresponding group in the third information, for each of the unit information pieces in the first information, and generate the evaluation information, based on a comprehensive value of the scores of each of the unit information pieces in the first information.

The evaluation information generation means can weight the scores, based on a ranking of each of the unit information pieces in the first information.

The evaluation information generation means can weight the scores, based on a degree of relevance to each of the unit information pieces belonging to a corresponding group in the third information, for each of the unit information pieces in the first information.

The evaluation information generation means can remove noise information from the unit information pieces in the first information, and generate the evaluation information, based on a comprehensive value of the scores of each of the unit information pieces, from which the noise information has been removed.

An information processing method and program according to one aspect of the present invention are a method and program compatible with the above-described information processing device according to one aspect of the present invention.

Effects of the Invention

The present invention can achieve an appropriate method for evaluating the quality of a publication such as a specification.

PREFERRED MODE FOR CARRYING OUT THE INVENTION

An embodiment of the present invention is hereinafter described with reference to the drawings.

Figure 1:
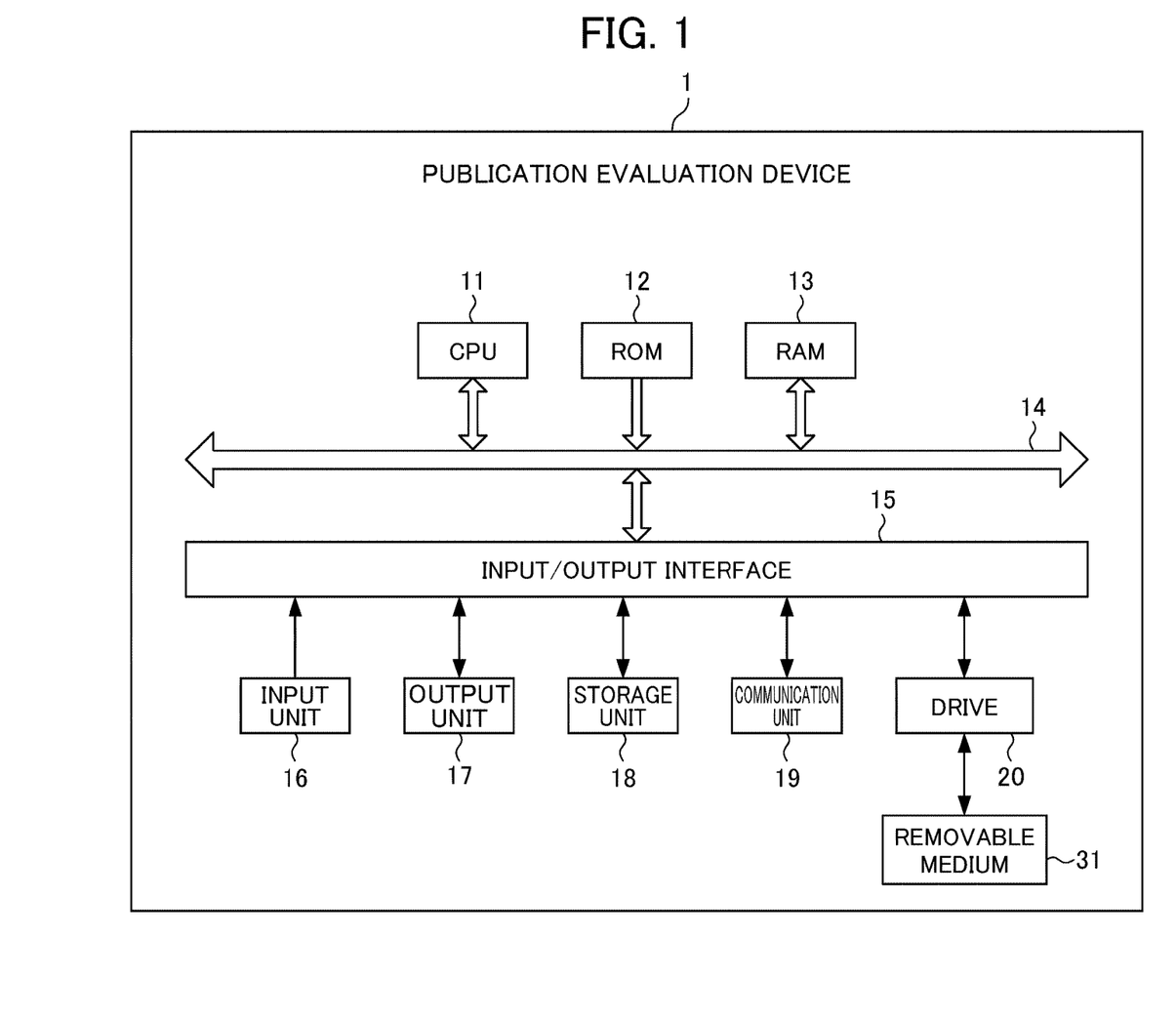
FIG. 1 is a block diagram illustrating a hardware configuration of a publication evaluation device as one embodiment of an information processing device, to which the present invention is applied.

FIG. 1 is a block diagram illustrating a hardware configuration of a publication evaluation device 1 as one embodiment of the information processing device of the present invention.

The publication evaluation device 1 includes a CPU (Central Processing Unit) 11, ROM (Read Only Memory) 12, RAM (Random Access Memory) 13, a bus 14, an input/output interface 15, an input unit 16, an output unit 17, a storage unit 18, a communication unit 19, and a drive 20.

The CPU 11 executes various processing in accordance with a program stored in the ROM 12, or a program loaded from the storage unit 18 into the RAM 13. Data required for the CPU 11 to execute various processing, etc. are also stored in the RAM 13 as appropriate.

The CPU 11, the ROM 12 and the RAM 13 are interconnected via the bus 14. The input/output interface 15 is also connected to the bus 14. The input unit 16, the output unit 17, the storage unit 18, the communication unit 19 and the drive 20 are connected to the input/output interface 15.

The input unit 16 is configured with a keyboard, a mouse, etc., and inputs a variety of information in accordance with instruction operations by an operator. The output unit 17 is configured with a display, a speaker, etc., and outputs images and sound. The storage unit 18 is configured with a hard disk, DRAM (Dynamic Random Access Memory), etc., and stores a variety of data. The communication unit 19 controls communication with other devices (not illustrated) via a network 4 including the Internet.

A removable medium 31, which is composed of a magnetic disk, an optical disk, a magneto optical disk, semiconductor memory or the like, is mounted on the drive 20 as appropriate. A program, which is read from the removable medium 31 by way of the drive 20, is installed on the storage unit 18 as necessary. Further, the removable medium 31 can also store a variety of data that has been stored in the storage unit 18, like the storage unit 18 does.

The publication evaluation device 1 having such a configuration, according to the present embodiment, is a device that evaluates the quality of a specification that may be included in a patent publication, a patent application publication, or a utility model registration publication. Note that, although the following description illustrates patent rights for the sake of convenience, the same applies, in essence, to utility model rights as well.

In order to acquire patent rights, it is required to submit an application, as well as claims, a specification, necessary drawings, and an abstract as documents attached to the application.

Claims should achieve a mission as a title deed of patent rights. More specifically, the technical scope of a patented invention is defined based on descriptions in the claims. A specification should achieve a mission as technical literature for disclosing the subject matter of the invention to third parties. Here, descriptions in the claims are required to fulfill the requirement that "an invention for which a patent is sought must be described in the Detailed Description of Invention" (hereinafter referred to as "support requirement"). Specifically, in Japan, the support requirement is stipulated under Japanese Patent Law, Article 36, Paragraph 6, No. 1. In Japan, the support requirement constitutes a reason for rejection (Japanese Patent Law, Article 49, Paragraph 4). In other words, in Japan, patent rights cannot be acquired unless the specification fulfils the support requirement. Therefore, whether the support requirement is fulfilled is one of the vital factors of the quality of the specification. Thus, the publication evaluation device 1 of the present embodiment generates an evaluation value indicating a degree of fulfilling the support requirement (hereinafter referred to as "support information fulfillment index") as evaluation information for evaluating contents of the specification, based on a frequency distribution of the terms included in the claims, and a frequency distribution of the terms included in the specification. A sequence of processing until generating evaluation information (support information fulfillment index) on a patent publication or a patent application publication to be evaluated is hereinafter referred to as "evaluation information generation processing".

Figure 2:
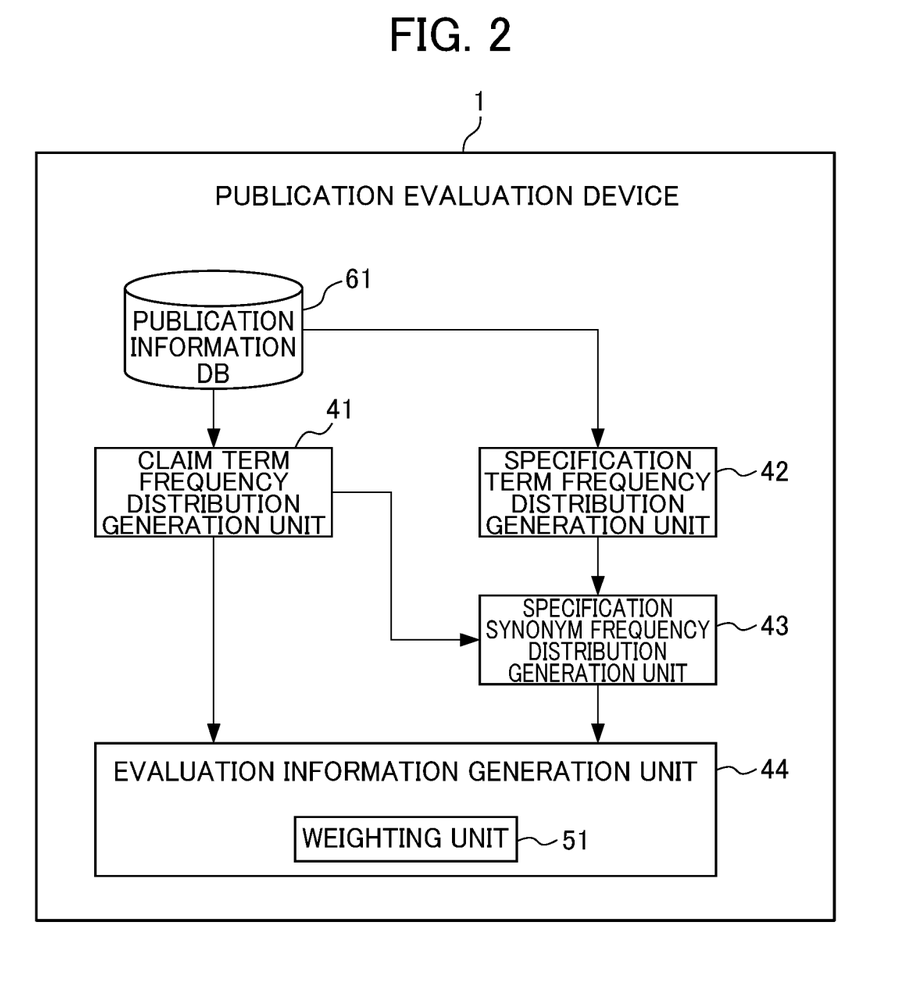
FIG. 2 is a functional block diagram illustrating a functional configuration of the publication evaluation device in FIG. 1.

FIG. 2 is a functional block diagram showing a functional configuration for executing the evaluation information generation processing, in relation to the functional configuration of the publication evaluation device 1. When the evaluation information generation processing is executed, a claim term frequency distribution generation unit 41, a specification term frequency distribution generation unit 42, a specification synonym frequency distribution generation unit 43, and an evaluation information generation unit 44 function in the CPU 11 of the publication evaluation device 1. Note that the evaluation information generation unit 44 includes a weighting unit 51. A publication information DB 61 is provided to one region of the storage unit 18 of the publication evaluation device 1.

The claim term frequency distribution generation unit 41 separates content of the claims included in a patent publication or a patent application publication to be evaluated into each term, and generates information indicating the frequency distribution of the terms separated (hereinafter referred to as "claim term frequency distribution").

The specification term frequency distribution generation unit 42 separates content of the specification included in the patent publication or the patent application publication to be evaluated into each term, and generates information indicating the frequency distribution of the terms separated (hereinafter referred to as "specification term frequency distribution").

Here, when a support information fulfillment index is generated, the claim term frequency distribution may be compared with the specification term frequency distribution; however, such a comparison may not result in an effective comparison in some cases. The reason for this is described below.

However, a specification is also required to fulfill, in addition to the support requirement described above, the requirement that the Detailed Description of the Invention is "described clearly and sufficiently to a degree that a person having ordinary knowledge in the technical field to which the invention belongs can practice the invention (hereinafter referred to as "enablement requirement"). Specifically, in Japan, the enablement requirement is stipulated under Japanese Patent Law, Article 36, Paragraph 4, No. 1. In Japan, the enablement requirement constitutes a reason for rejection (Japanese Patent Law, Article 49, No. 4). In other words, in Japan, patent rights cannot be acquired unless the specification fulfils the enablement requirement.

Here, since claims have characteristics of a title deed as described above, claims are frequently described in as broad a concept as possible in general, such that the scope of rights would be broad. Specifically, the terms appearing in the claim term frequency distribution are frequently vague terms in a broader concept. In contrast, a specification, which should fulfil the enablement requirement, is frequently described with terms representing specific technical contents in a narrower concept, illustrating examples of the broader concept (the terms described in the claims). In short, in a specification, terms representing specific technical contents frequently appear as terms describing the broader concept. In other words, in the specification, the terms of the broader concept described in the claims are less frequently directly used for describing the embodiment, and are frequently described with the terms of a plurality of narrower concepts (illustration by examples). Therefore, a simple comparison between the claim term frequency distribution and the specification term frequency distribution may not result in an effective comparison in some cases.

Thus, according to the present embodiment, the specification synonym frequency distribution generation unit 43 classifies each term extracted from the specification into a plurality of groups that correspond to a plurality of terms (broader concepts), respectively, in the claims. Here, a technique for classification into a plurality of groups is not specifically limited; however, according to the present embodiment, a technique of classifying synonyms into the same group is employed, in which a broader concept of a plurality of synonyms corresponds to a single predetermined term in the claims. The specification synonym frequency distribution generation unit 43 generates information indicating the frequency distribution, in which each of the plurality of groups classified (groups corresponding to the plurality of terms in the claims) serves as a unit. Such information is hereinafter referred to as "specification synonym frequency distribution".

The evaluation information generation unit 44 generates a support information fulfillment index (evaluation information), based on the claim term frequency distribution and the specification synonym frequency distribution. For example, according to the present embodiment, the evaluation information generation unit 44 compares a frequency ranking in the terms included in the claim term frequency distribution with a frequency ranking in the groups included in the specification synonym frequency distribution (a group corresponding to a predetermined term in the claim term frequency distribution), thereby calculating a similarity therebetween. The evaluation information generation unit 44 generates the similarity or a processed value thereof as a support information fulfillment index (evaluation information). Specifically, for example, for each term in the claim term frequency distribution, the evaluation information generation unit 44 calculates scores based on the ranking difference from the corresponding group in the specification synonym frequency distribution, and generates a support information fulfillment index (evaluation information), based on a comprehensive value of the scores of each term in the claim term frequency distribution.

Figure 3:
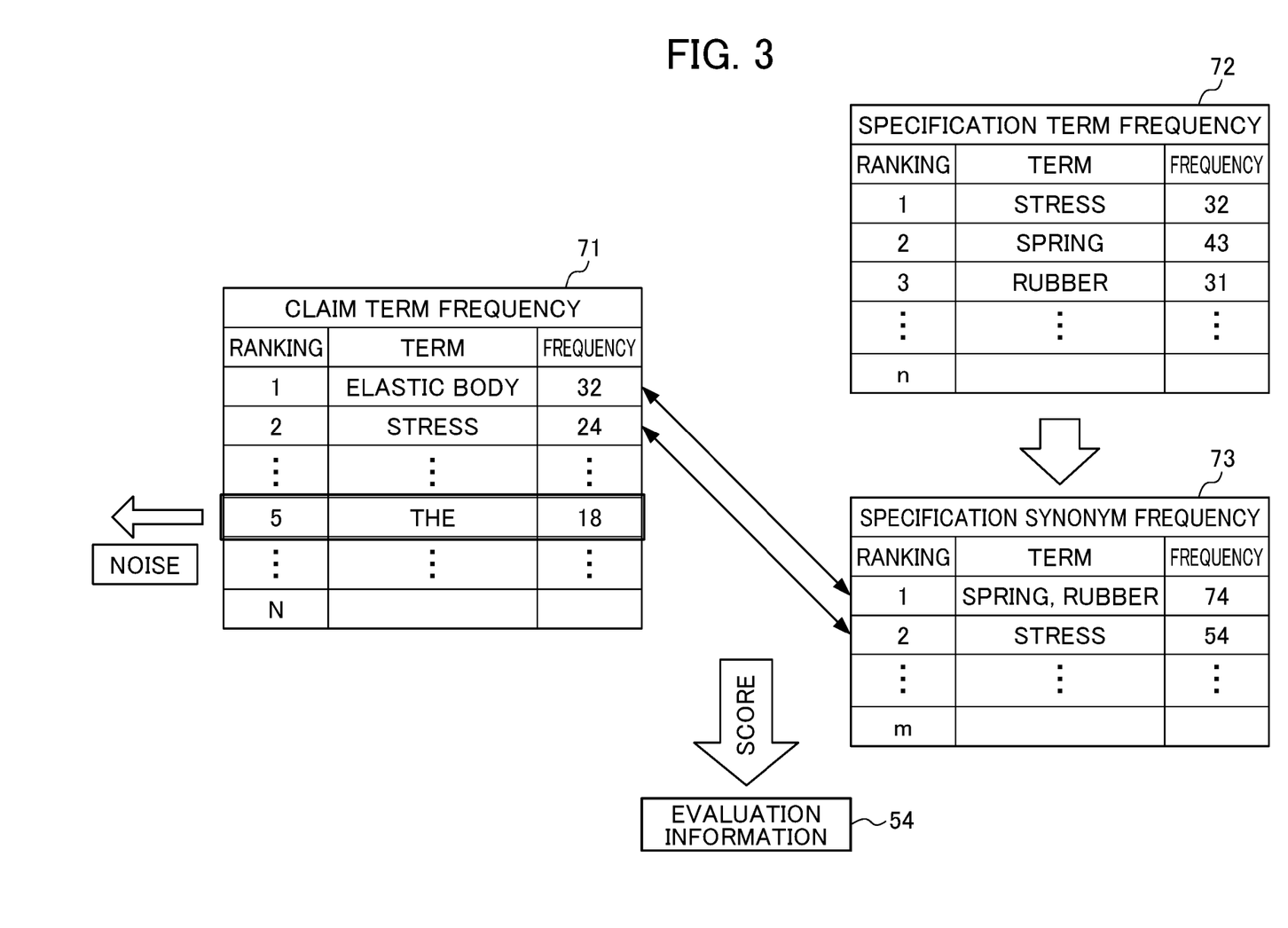
FIG. 3 is a schematic diagram illustrating an outline of evaluation information generation processing executed by the publication evaluation device having the functional configuration in FIG. 2.

FIG. 3 is a schematic diagram illustrating an outline of the evaluation information generation processing executed by the publication evaluation device 1 having such a functional configuration in FIG. 2.

In the example in FIG. 3, the frequency ranking in a claim term frequency 71 shows that the first place is "elastic body" and the second place is "stress". Here, the frequency ranking in a specification term frequency 72 shows that the first place is "stress", the second place is "spring", and the third place is "rubber". Therefore, when the specification term frequency 72 is compared with the claim term frequency 71 in relation to the frequency ranking, the first place differs between the claims and the specification, and "elastic body" as the first place in the claims is not listed in the ranking in the specification. As a result, when a support information fulfillment index (evaluation information) is generated simply based on this ranking, the value may become low, as the similarity is low (the degree of matching is low).

Specifically, for example, a score "1" will be given if the rankings are the same, a score "0.9" will be given if the ranking difference is 1, a score "0.8" will be given if the ranking difference is 2, the score will subsequently decrease by 0.1 each time the ranking difference increases, and a flat score "0" will be given after the score becomes "0". In this case, in relation to the claim term frequency 71, the score of "elastic body" as the first place is "0.9", and the score of "stress" as the second place is "0". If a comprehensive value of these scores is a support information fulfillment index (evaluation information), the value will be "0.9". The reason why the support information fulfillment index (evaluation information) which should essentially be a high value becomes low in this manner is that "elastic body" as a broader concept is not associated with "spring" and "rubber" as a narrower concept thereof.

Thus, according to the present embodiment, the specification synonym frequency distribution generation unit 43 classifies "spring" and "rubber" extracted from the specification into a group corresponding to "elastic body" of the claims. As the result of such classification, a specification synonym frequency 73 is generated. In relation to the frequency ranking in the specification synonym frequency 73, the first place is the group to which "spring, rubber" belongs, namely the group corresponding to "elastic body" of the claims. The second place is the group to which "stress" belongs, namely the group corresponding to "stress" of the claims. In this case, since each ranking is the same between the claim term frequency 71 and the specification synonym frequency 73, when a support information fulfillment index (evaluation information) is generated based on this ranking, the value will be high, as the similarity is high (the degree of matching is high).

Specifically, for example, when a higher score is used, in relation to the claim term frequency 71, the score of "elastic body" as the first place will be "1", and the score of "stress" as the second place will also be "1". Therefore, a comprehensive value "2" of these scores, which is a high value, will become a support information fulfillment index (evaluation information).

Here, both the claim term frequency 71 and the specification synonym frequency 54 are a distribution based on a simple appearance frequency of the terms. The reliability of the support information fulfillment index (evaluation information) based on such a simple comparison between the appearance frequencies may not be considered high, in some cases. Thus, the evaluation information generation unit 44 of the present embodiment is provided with the weighting unit 51.

For example, if scores based on the above-described frequency ranking are employed, the evaluation information generation unit 44 can weight the scores, based on the ranking of each term in the claim term frequency 71. For example, even if the rankings are the same, when the same ranking in the first place is compared with the same ranking in the tenth place, the former can be considered higher in the ratio of contribution to the overall similarity. Thus, the weighting unit 51 weights the scores, such that the score of the same ranking in the first place is higher, and the score of the same ranking in the tenth place is lower. For example, the scores are weighted such that the score of the same ranking in the first place will be "2", and the score of the same ranking in the tenth place will be "0.2".

Further, for example, the evaluation information generation unit 44 can also weight the scores, based on a degree of relevance to each term that belongs to a corresponding group in the specification synonym frequency 73, for each term in the claim term frequency 71. For example, in relation to the group corresponding to "elastic body" of the claims, "spring, rubber" are in the group corresponding thereto in the specification synonym frequency 73. Although these terms are the narrower concepts of "elastic body", the term "elastic body" itself is not included in the group. On the other hand, in relation to the group corresponding to "stress" of the claims, the term "stress" itself is included in the group corresponding thereto in the specification synonym frequency 73. Thus, rather than "elastic body" of the claims, the weighting unit 51 adds more weight to "stress" of the claims, since the term of a higher relevance belongs to the corresponding group.

The support information fulfillment index (evaluation information) which is generated after the various weighting in this manner is expected be a value closer to the reality. In other words, the weighting allows for generating a more highly accurate support information fulfillment index (evaluation information).

Here, in relation to the claim term frequency 71, a term different from terms that characterize a patented invention, for example, a generic term such as "the" illustrated in FIG. 3, may be ranked high in the frequency ranking. Thus, such a term should be removed as noise information. More specifically, the evaluation information generation unit 44 removes noise information (for example, the term "the") from each term in the claim term frequency 71, and generates a support information fulfillment index (evaluation information), based on a comprehensive value of the scores of each term, from which the noise information has been removed.

The support information fulfillment index (evaluation information) which is generated after removing the noise in this manner is expected to be a value closer to the reality. In other words, removing the noise allows for generating a more highly accurate support information fulfillment index (evaluation information).

Figure 4:
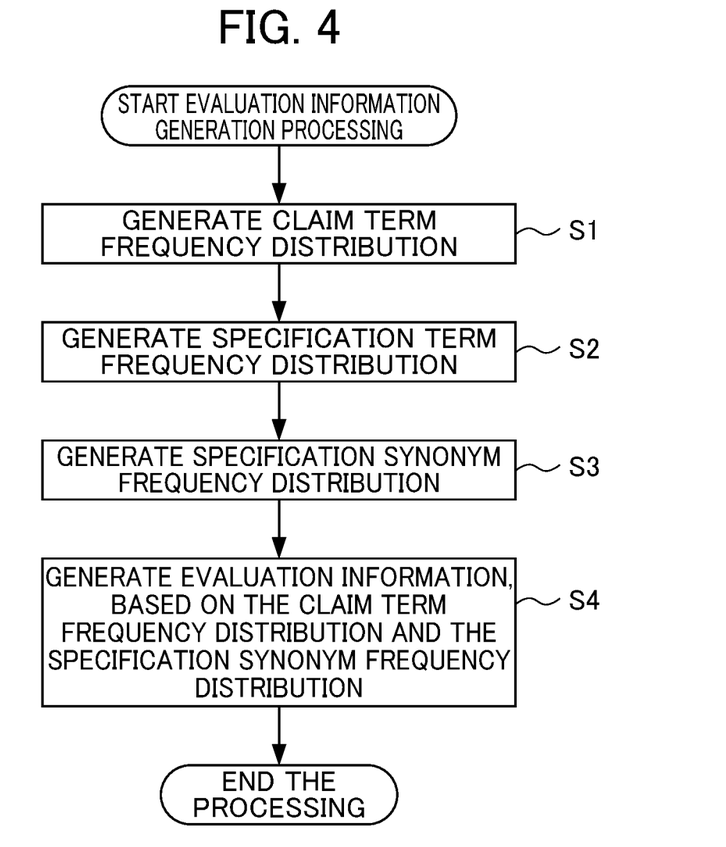
FIG. 4 is a flowchart illustrating the flow of the evaluation information generation processing executed by the publication evaluation device 1 having the functional configuration in FIG. 2.

FIG. 4 is a flowchart illustrating the flow of the evaluation information generation processing executed by the publication evaluation device 1 having the functional configuration in FIG. 2.

In Step S1, the claim term frequency distribution generation unit 41 generates a claim term frequency distribution. In Step S2, the specification term frequency distribution generation unit 42 generates a specification term frequency distribution. In Step S3, the specification synonym frequency distribution generation unit 43 generates a specification synonym frequency distribution. In Step S4, the evaluation information generation unit 44 generates a support information fulfillment index (evaluation information), based on the claim terms degree distribution and the specification synonym frequency distribution. As a result, the evaluation information generation processing is ended.

The embodiment of the present invention has been described above; however, the present invention is not limited to the above-described embodiment. Further, the effects described in the present embodiment are merely enumeration of the most preferred effects arising from the present invention, and the effects according to the present invention are not limited to those described in the present embodiment.

For example, according to the above-described embodiment, a frequency distribution is generated by extracting each term from the claims of a patent publication or a patent application publication, and a frequency distribution is generated by extracting each term from the specification. However, without any specific limitation to the above-described embodiment, for example, a character, diagram, symbol or combination thereof (hereinafter referred to as "character, etc.") may be extracted from the specification, drawings or abstract. Moreover, although the above-described embodiment employs publications relating to patents, the present invention does not have to be specifically limited to patents, and can be applied to evaluation of publications, in general, relating to intellectual property rights which are granted on the premise of submission of at least two types of documents including a character, etc.

Further, for example, according to the above-described embodiment, a term is a unit information piece for a frequency distribution; however, without any specific limitation thereto, an arbitrary unit information piece composed of a character, diagram, symbol or combination thereof can be employed.

In other words, it is sufficient that the information processing device, to which the present embodiment is applied, includes a configuration as follows; and a wide variety of embodiments can be employed.

Specifically, the information processing device of the present invention includes: first information generation means (e.g. a claim term frequency distribution generation unit 41 in FIG. 2) that separates a content of a first document (e.g. claims) that may be included in a publication relating to an intellectual property right into predetermined unit information pieces (e.g. terms) composed of a character, diagram, symbol or combination thereof, and generates first information (e.g. a claim term frequency distribution) indicating a frequency distribution of the unit information pieces separated; second information generation means (e.g. a specification term frequency distribution generation unit 42 in FIG. 2) that separates a content of a second document (e.g. a specification) that may be included in the publication into the unit information pieces (e.g. terms), and generates second information (e.g. a specification term frequency distribution) indicating a frequency distribution of the unit information pieces separated; and evaluation information generation means that generates evaluation information for evaluating the content of the publication, based on the first information and the second information.

By employing the information processing device as such, a publication relating to an intellectual property right can be more appropriately evaluated.

Note that the content of the first document and the content of the second document that may be included in the publication do not have to be a copy of the publication, but are intended to also include each content of the first document and the second document that would be included in such a publication if issued. In other words, issuance of a publication is not essential, in particular; and the phrase "may be included in the publication" means including a possibility that information indicating the contents of the first document and the second document may exist, even at a stage before filing or a stage remaining unpublished after filing.

Therefore, the contents of the first document and the second document that may be included in the publication also include contents such as, for example, contents of copy data of "claims" or "specification" maintained at the applicant's side at a stage remaining unpublished after filing, or contents of documents describing the contents of "claims" or "specification" at a stage before filing (e.g. an invention report, etc. created at the applicant's side). Further, the second user does not have to be a business operator as a candidate for such practice, in particular, and may also be intellectual property personnel at the applicant's side, etc. Based upon the foregoing, for example, intellectual property personnel at the patent applicant's (company's) side can evaluate a draft specification at the stage before filing, and can therefore file an application by refining a less evaluated draft specification to a highly evaluated one.

In addition, such evaluation information can be applied to other fields such as patent analysis. For example, this can be utilized for revising (weighting) a patent evaluation index based on the number of forward citations. Further, for example, when searching for a licensee candidate based on a patent analysis, a patent composed of a specification having high-level evaluation information (support information fulfillment index) can be preferentially presented as a patent that is "highly likely to match" the licensee candidate, etc.

The sequence of processing described above can be executed by way of hardware, or can be executed by way of software as well. In other words, the functional configuration in FIG. 3 merely illustrates an example, and is not specifically limited. Specifically, it is sufficient that the publication evaluation device 1 has a function capable of executing the above-mentioned sequence of processing as a whole, and what type of functional blocks should be used to implement this function is not limited to the example in FIG. 2, in particular. A single functional block may be configured with a single piece of hardware, a single installation of software, or a combination thereof.

When a sequence of processing is executed by way of software, a program configuring the software is installed from a network or a storage medium into a computer or the like. The computer may be a computer embedded in dedicated hardware. Further, the computer may be a computer capable of executing various functions by installing various programs, e.g., a general-purpose personal computer.

The storage medium containing such a program not only can be constituted by the removable medium 31 illustrated in FIG. which is distributed separately from the device main body in order to supply the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk) or the like. The magnetic optical disk is composed of an MD (Mini-Disk) or the like. The storage medium for the program may be a non-transitory storage medium as seen in these examples. The storage medium supplied to the user in a state incorporated in the device main body in advance may include, for example, the ROM 12 illustrated in FIG. 1, a hard disk included in the storage unit 18 or the like, in which the program is recorded.

It should be noted that, in the present specification, the steps defining the program recorded in the storage medium include not only the processing executed in a time series following this order, but also processing executed in parallel or individually, which is not necessarily executed in a time series.

EXPLANATION OF REFERENCE NUMERALS

| Numeral | Item |
|---------|------|
| 1 | publication evaluation device |
| 11 | CPU |
| 12 | ROM |
| 13 | RAM |
| 14 | bus |
| 15 | input/output interface |
| 16 | input unit |
| 17 | output unit |
| 18 | storage unit |
| 19 | communication unit |
| 20 | drive |
| 31 | removable medium |
| 41 | claim term frequency distribution generation unit |
| 42 | specification term frequency distribution generation unit |
| 43 | specification synonym frequency distribution generation unit |
| 44 | evaluation information generation unit |
| 51 | weighting unit |
| 61 | publication information DB |

The invention claimed is:

1. An information processing device, comprising at least:
a processor; and
a memory,
wherein the processor executes a program stored in the memory to perform operations comprising:
separating content of a first document portion included in a publication relating to an intellectual property right into predetermined unit information pieces including a character, diagram, symbol or combination thereof, and generating first information indicating a frequency distribution of the unit information pieces separated;
separating content of a second document portion included in a publication relating to the intellectual property right into the predetermined unit information pieces, and generating second information indicating a frequency distribution of the unit information pieces separated;
classifying each of the unit information pieces in the second information into a plurality of groups respectively corresponding to a plurality of unit information pieces in the first information, which are broader concepts of the unit information pieces in the second information, and generating third information indicating a frequency distribution, in which each of the plurality groups classified serves as a unit; and
generating evaluation information for evaluating the content of the publication, based on the first information and the third information, wherein:
in the evaluation information generation, for each of the unit information pieces in the first information, a score is calculated based on a difference of ranking in the respective frequency distribution of the unit information piece in the first information from a corresponding group in the third information, wherein the score is higher when the difference of ranking in the respective frequency distribution between the unit information pieces in the first information and the corresponding group in the third information is lower; and the evaluation information is a comprehensive value obtained by summing up the scores of each of the unit information pieces in the first information, the evaluation information indicating a degree of fulfilling of the support requirement of the intellectual property right, wherein the higher the value of the comprehensive value, the better the support requirement of the intellectual property right is fulfilled, wherein the intellectual property right is a patent right or a utility model right;

the first document portion is a claim;

the second document portion is a specification, a drawing, or an abstract; and the processor is configured to remove noise information from the unit information pieces in the first information, and generates the evaluation information, based on a comprehensive value of the scores of each of the unit information pieces, from which the noise information has been removed.

2. The information processing device according to claim 1, wherein the processor is configured to weight the scores based on a ranking of each of the unit information piece in the first information.

3. The information processing device according to claim 1, wherein the processor is configured to weight the scores based on a degree of relevance to each of the unit information pieces belonging to a corresponding group in the third information, for each of the unit information pieces in the first information.

4. An information processing method executed by a processor according to a program stored in a memory, the processor and the memory are constituent parts of an information processing device, the method comprising:

separating content of a first document portion included in a publication relating to an intellectual property right into predetermined unit information pieces including a character, diagram, symbol or combination thereof;

generating first information indicating a frequency distribution of the unit information pieces separated;

separating content of a second document portion included in a publication relating to the intellectual property right into the predetermined unit information pieces;

generating second information indicating a frequency distribution of the unit information pieces separated;

classifying each of the unit information pieces in the second information into a plurality of groups respectively corresponding to a plurality of unit information pieces in the first information, which are broader concepts of the unit information pieces in the second information;

removing noise information from the unit information pieces in the first information;

generating third information indicating a frequency distribution, in which each of the plurality groups classified serves as a unit;

generating evaluation information for evaluating the content of the publication, based on the first information and the third information, wherein:

generating the evaluation information comprises calculating, for each of the unit information pieces in the first information, a score based on a difference of the unit information piece in the first information from a corresponding group in the third information, wherein the score is higher when the difference of ranking in the respective frequency distribution between the unit information pieces in the first information and the corresponding group in the third information is lower; and the evaluation information is a comprehensive value obtained by summing up the scores of each of the unit information pieces in the first information from which the noise information has been removed, the evaluation information indicating a degree of fulfilling of the support requirement of the intellectual property right, wherein the higher the value of the comprehensive value, the better the support requirement of the intellectual property right is fulfilled; wherein the intellectual property right is a patent right or a utility model right;

the first document portion is a claim; and the second document portion is a specification, a drawing, or an abstract.

5. A non-transitory computer readable medium storing a program expanded in a memory, which is a constituent part of a computer, to cause a processor, which is also a constituent part of the computer, to perform operations comprising:

separate content of a first document portion included in a publication relating to an intellectual property right into predetermined unit information pieces including a character, diagram, symbol or combination thereof;

generate first information indicating a frequency distribution of the unit information pieces separated;

separate content of a second document portion included in a publication relating to the intellectual property right into the predetermined unit information pieces;

generate second information indicating a frequency distribution of the unit information pieces separated;

classify each of the unit information pieces in the second information into a plurality of groups respectively corresponding to a plurality of unit information pieces in the first information, which are broader concepts of the unit information pieces in the second information;

removing noise information from the unit information pieces in the first information;

generate third information indicating a frequency distribution, in which each of the plurality groups classified serves as a unit; and generate evaluation information for evaluating the content of the publication, based on the first information and the third information, wherein the generation of the evaluation information comprises a calculation, for each of the unit information pieces in the first information, of a score based on a difference of ranking in the respective frequency distribution of the unit information piece in the first information from a corresponding group in the third information, wherein the score is higher when the difference of ranking in the respective frequency distribution between the unit information pieces in the first information and the corresponding group in the third information is lower; and the evaluation information is a comprehensive value obtained by summing up the scores of each of the unit information pieces in the first information from which the noise information has been removed, the evaluation information indicating a degree of fulfilling of the support requirement of the intellectual property right, wherein the higher the value of the comprehensive value, the better the support requirement of the intellectual property right is fulfilled; wherein the intellectual property right is a patent right or a utility model right;
the first document portion is a claim; and
the second document portion is a specification, a drawing, or an abstract.

\* \* \* \* \*